United States Patent [19]

Edgar

[11] Patent Number: 5,543,820

[45] Date of Patent: Aug. 6, 1996

[54] METHOD AND APPARATUS FOR LINEAR COLOR PROCESSING

[75] Inventor: Albert D. Edgar, Austin, Tex.

[73] Assignee: International Business Machines Corporation, Armonk, N.Y.

[21] Appl. No.: 403,111

[22] Filed: Mar. 13, 1995

Related U.S. Application Data

[63] Continuation of Ser. No. 925,712, Aug. 4, 1992, abandoned.

[51] Int. Cl.[6] .................................................. G09G 5/04
[52] U.S. Cl. ........................ 345/153; 348/674; 358/519
[58] Field of Search ........................... 395/131; 348/674, 348/675; 358/518, 519, 520, 521; 345/154, 186, 153, 199

[56] References Cited

U.S. PATENT DOCUMENTS

| | | | |
|---|---|---|---|
| 2,031,728 | 2/1936 | Nyquist | 348/674 |
| 2,179,414 | 11/1939 | Konkle | 348/674 |
| 3,790,702 | 2/1974 | Kubota et al. | 348/675 |
| 4,030,121 | 6/1977 | Faroudja | 348/674 |
| 4,459,677 | 7/1984 | Porter | 345/154 |
| 4,812,905 | 3/1989 | Rossi | 348/630 |
| 4,833,527 | 5/1989 | Kondo | 348/675 |
| 4,985,853 | 1/1991 | Taylor | 345/154 |
| 5,008,741 | 4/1991 | Knierim et al. | 348/675 |
| 5,068,718 | 11/1991 | Iwabe et al. | 348/675 |
| 5,087,966 | 2/1992 | Harradine | 348/675 |
| 5,124,688 | 6/1992 | Rumball | 345/154 |
| 5,196,924 | 3/1993 | Lumelsky | 348/674 |
| 5,196,937 | 3/1993 | Kageyama | 348/674 |
| 5,202,763 | 4/1993 | Sandalweck | 348/674 |
| 5,291,102 | 3/1994 | Washburn | 348/813 |
| 5,311,297 | 5/1994 | Seki et al. | 348/675 |

OTHER PUBLICATIONS

"Colorimetric Calibration for Scanners and Media", Po–Chieh Hung, Center for Imaging Science, Rochester Institute of Technology.

IBM Technical Disclosure Bulletin, "Color or Grey Scale Selection Circuit with Corrected D/A Converter", vol. 28, No. 3, Aug. 1985, pp. 1217–1221.

Primary Examiner—Richard Hjerpe
Assistant Examiner—Lun-Yi Lao
Attorney, Agent, or Firm—Paul S. Drake; Volel Emile

[57] ABSTRACT

A method for processing multiple color signals representing an image including the steps of obtaining multiple linear color signals representing the image, translating the multiple linear color signals to a linear luminance signal and at least one linear chrominance signal, converting the linear luminance signal to a nonlinear luminance signal and converting the linear chrominance signal to a non-linear chrominance signal by dividing the linear chrominance signal by a non-linear luminarice signal. In addition, an apparatus for processing multiple color signals representing an image including apparatus for obtaining multiple linear color signals representing the image, apparatus for translating the multiple linear color signals to a linear luminance signal and at least one linear chrominance signal, and apparatus for converting the linear luminance signal to a nonlinear luminance signal.

26 Claims, 9 Drawing Sheets

METHOD AND APPARATUS FOR LINEAR COLOR PROCESSING

RELATED PATENT APPLICATIONS

This is a continuation of application Ser. No. 07/925,712 filed Aug. 4, 1992 now abandoned.

This patent application is related to copending patent application Ser. No. 07/925,710, filed Aug. 04, 1992 (concurrently with the present application), entitled "METHOD AND APPARATUS FOR GRAYSCALE ADJUSTMENT", hereby incorporated by reference, and copending patent application Ser. No. 07/925,340, filed Aug. 04, 1992 (concurrently with the present application), entitled "PALETTIZED FUZZY MASK", hereby incorporated by reference.

TECHNICAL FIELD

The present invention relates generally to color processing and more specifically to linear color processing for improved image detail and color.

BACKGROUND ART

Figure 1:
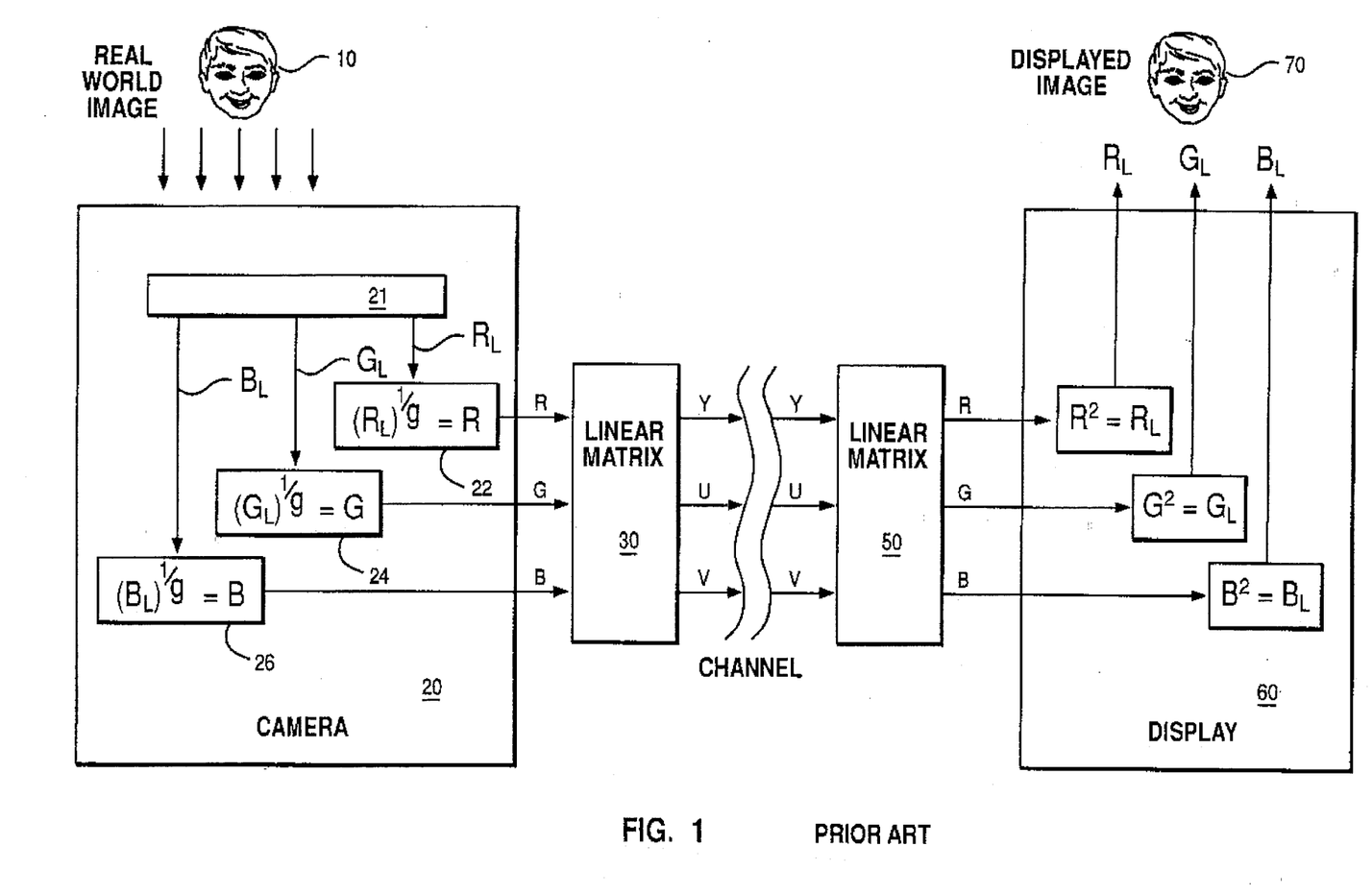
FIG. 1 illustrates an example of standard nonlinear color processing.

Nonlinear color processing techniques are well known in the prior art such as in NTSC or PAL television. FIG. 1 illustrates an example of standard nonlinear color processing.. A real world image 10, such as a commentator for an Olympic sports event, reflects blue, green and red colors. These colors are detected by a camera 20 by a photodetector 21 which generates linear red, blue and green ($R_L$, $B_L$, $G_L$) signals. Within the camera, the linear red, green and blue signals are gamma adjusted primarily to reduce noise and to prepare the signal for display. The gamma adjustment is performed by taking the 1/g power, where g is the gamma factor (typically 2) of the linear red, green and blue signals, thereby providing what is commonly known as RGB (red, green and blue) color signals. For example, when linear red, blue and green signals are detected by a photon responsive device such as a camera, the photon quantum noise, also known as shot noise, increases as the square of the luminance. That is, shot noise is equal to the square root of the number of photons detected for a given color. By taking the square root of each of the color signals, the amount of shot noise is equivalent for all levels of brightness for each of the colors. Secondly, the eventual display of the RGB signal naturally squares the RGB signals during the electron discharge process.

The nonlinear RGB signals are then translated or converted to a nonlinear YUV signal for data compression by using a well known linear matrix 30. This conversion is performed to provide for a separate luminance signal (Y) and chrominance signals (UV). The Y signal contains the luminance or grayscale for all three colors. The U and V signal carry the chrominance information for all three colors. Due to the high sensitivity of the human eye to luminance detail, the Y signal is typically transmitted or stored using a higher bandwidth transmission or storage technique and may not be compressed or may be slightly compressed according to well known image compression techniques. In addition, due to low sensitivity of the human eye to details in color, the UV signals are typically transmitted or stored using lower bandwidth transmission or storage techniques and are usually highly compressed using well known image compression techniques. The YUV signals may then be stored in analog form on a videotape, laser disk or the like or in digital form on a computer memory, a CD-ROM (compact disk— read only memory) or the like. The YUV signals may also be transmitted in digital form such as on a computer bus or in analog form such as in an NTSC (national television standards committee) transmission. The NTSC transmission process is a result of the movement from black and white television to color television several decades ago. The original black and white or luminance signal is the Y signal. The subsequently added color Signals U and V were added to the original luminance or Y signal. The nonlinear YUV signal is then transmitted or stored on a channel 40. The channel may use well known techniques for image compression as discussed above. The compressed image is then decompressed by the channel and is then received as a nonlinear YUV signal. The nonlinear YUV signal is then translated or converted to a nonlinear RGB signal through a second well known linear matrix 50. The RGB signal is then displayed on a display 60. As mentioned earlier, todays common display processes inherently square the red, green and blue signals thereby providing nearly true or linear red, green and blue output as displayed image 70.

Figure 2A:
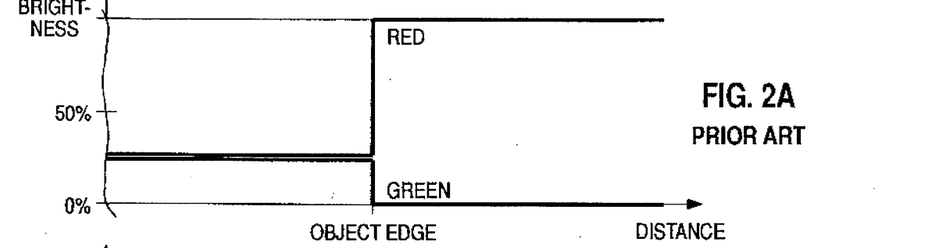
FIGS. 2A–2E illustrate a common problem with today's typical nonlinear color processing techniques.
Figure 2B:
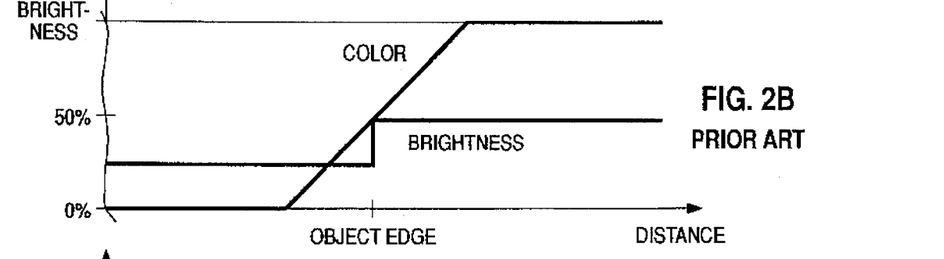
Figure 2C:
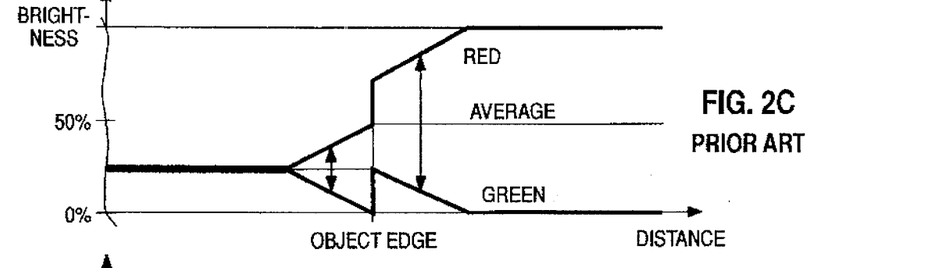
Figure 2D:
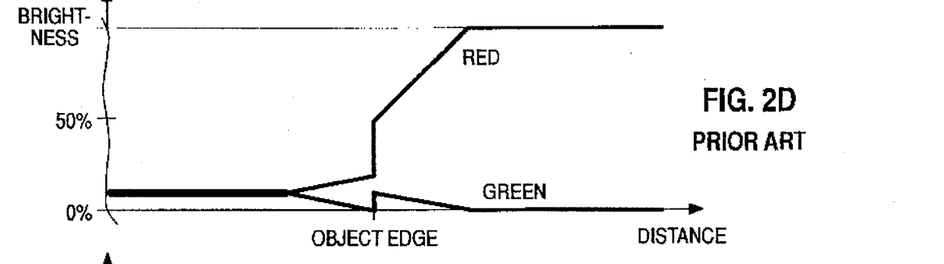
Figure 2E:
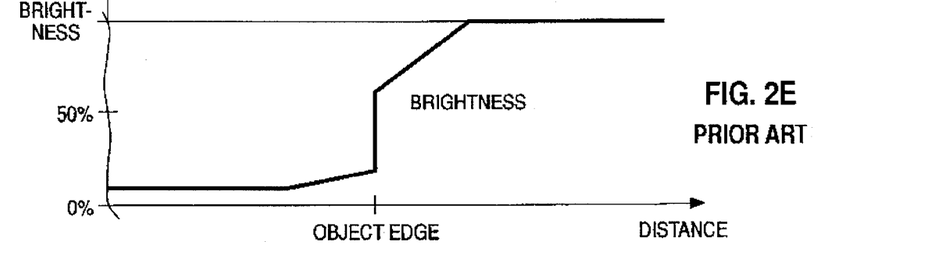

FIGS. 2A–2E illustrate a common problem with today's typical nonlinear color processing techniques. For simplicity of explanation, assume a two color red-green world where the eye is equally sensitive to both colors. In this case there are only RG and YU color signals rather than RGB and YUV. Given a bright red object over a dark gray or red-green background, a scan line is generated by a camera of the background and object would be as shown in FIG. 2A. This includes the red and green signals being gamma adjusted by the camera. The brightness of the red and green signals is dark gray or about 20% across the scan line until the edge of the object is reached. At that point, the green signal drops to black or about 0% luminance while the red signal increases to white or about 100% luminance. As a result of the process described in FIG. 1 including image compression of the U signal, the YU luminance and color signals are received on the channel as shown in FIG. 2B. In this simplified case, Y=(R+G)/2 and U=(R–G) using prior art techniques. The overall luminance or brightness (Y) signal is about a 20% level until the edge of the object is reached where the luminance signal increases abruptly to about a 50% level. This abrupt edge of the luminance signal is due to the typically high bandwidth of the luminance or brightness (Y) signal. The color signal (U), as shown in FIG. 2B, has a gradual or slanted slope rather than vertical or abrupt transition due to the typically lower bandwidth and compression of the U carrier. FIG. 2C shows the received signal from the channel after the YU signal has been converted back to RG where R=Y+U/2 and G=Y–U/2. Note that the average of the R and G, which is the average of Y+U/2 and Y–U/2, is equal to the luminance signal of FIG. 2B as expected. Deviation from the average, as shown by the arrows in FIG. 2C, is equal to the color signal of FIG. 2B as expected. The variation of the R and G signals of FIG. 2C from FIG. 2A is a result of the typically lower bandwidth of the U color signal. FIG. 2D illustrates the displayed signal with the R and G signals being squared by the typical display process. FIG. 2E illustrates the brightness of the viewed image as seen by the user which is the sum of the displayed red and green signals. Note that even though the brightness or luminance (Y) signal was provided the typically full bandwidth for no loss of signal, the resulting brightness of the viewed object has a fuzzy or blurry transition at the object edge. This is due to an undesirable crossover effect of the typically lower bandwidth or compression of the color (U) signal.

DISCLOSURE OF THE INVENTION

The present invention includes a method for processing multiple color signals representing an image including the steps of obtaining multiple linear color signals representing the image, translating the multiple linear color signals to a linear luminance signal and at least one linear chrominance signal, and converting the linear luminance signal to a nonlinear luminance signal. In addition, the present invention includes an apparatus for processing multiple color signals representing an image including apparatus for obtaining multiple linear color signals representing the image, apparatus for translating the multiple linear color signals to a linear luminance signal and at least one linear chrominance signal, and apparatus for converting the linear luminance signal to a nonlinear luminance signal.

A further understanding of the nature and advantages of the present invention may be realized by reference to the remaining portions of the specification and the drawings.

BEST MODE FOR CARRYING OUT THE INVENTION

Figure 3:
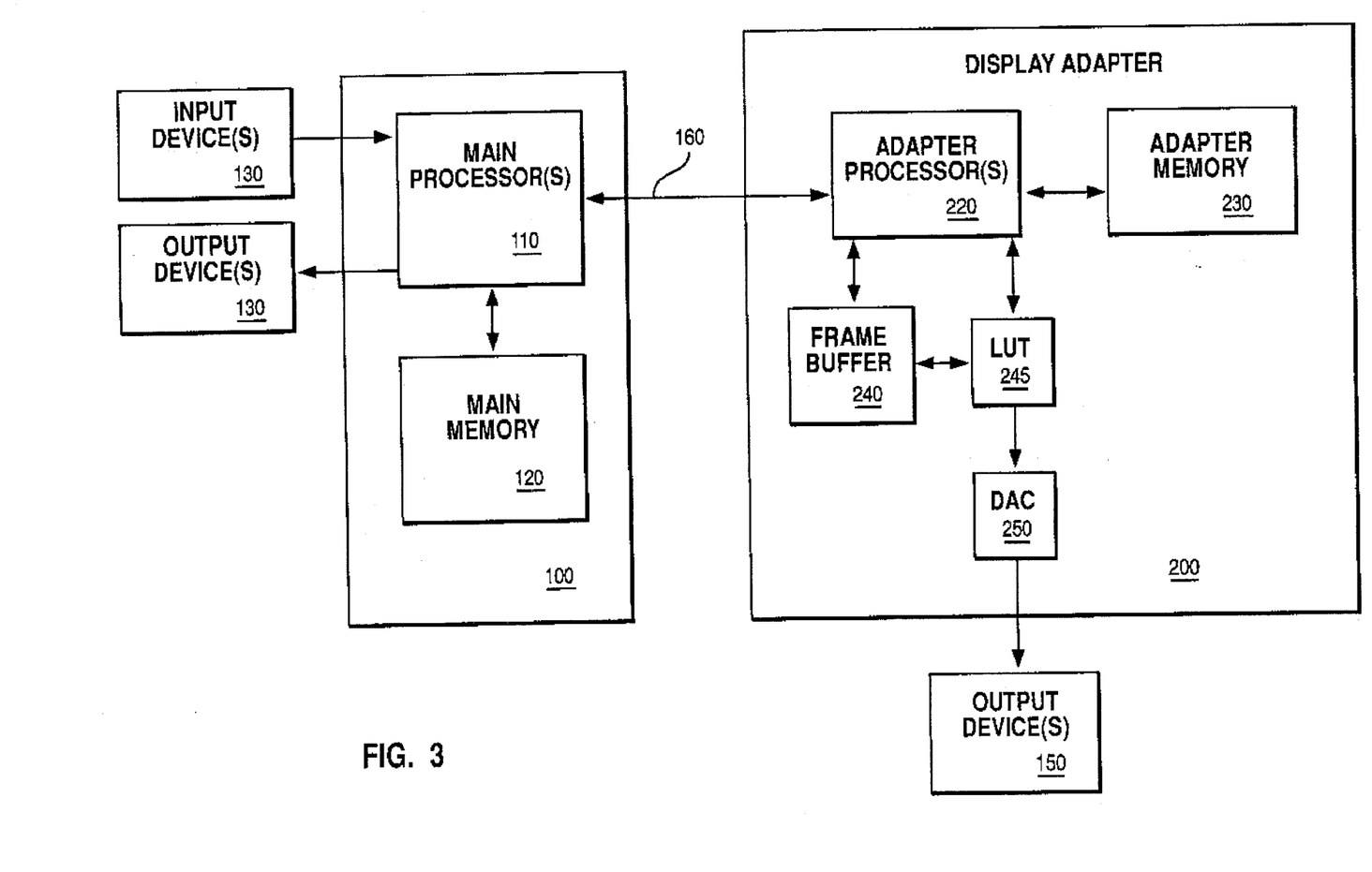
FIG. 3 is a block diagram of a typical digital computer utilized by a preferred embodiment of the invention.

FIG. 3 is a block diagram of a typical digital computer 100 utilized by a preferred embodiment of the invention. The computer, preferably one in the IBM multimedia PS/2 series of computers, includes main processor(s) 110 coupled to a main memory 120, input device(s) 130 and output device(s) 140. Main processor(s) 110 may include a single processor or multiple processors. Main processor is preferably one of the Intel family of 8088, 286, 386 or 486 microprocessors. However, other microprocessors may be utilized such as the Motorola family of 68000, 68020 or 68030 microprocessors, or one of the various Reduced Instruction Set Computer (RISC) microprocessors manufactured by IBM, Hewlett Packard, Sun, Motorola and others. Input device(s) 130 may include a keyboard, mouse, tablet or other types of input devices. Output device(s) 140 may include a text monitor, plotter, printer or other types of output devices. The main processor may also be coupled to display output device(s) 150 such as a graphics display through a display adapter 200. Display adapter 200 receives instructions regarding graphics or display information from main processor 110 on bus 160. The display adapter then executes those instructions with display adapter processor(s) 220 coupled to a display adapter memory 230. Some display adapters may not include a processor. The display processors in the display adapter then execute those instructions and updates frame buffer(s) 240 and video look up table (LUT) 245 based on those instructions. Display processor(s) 220 may also include specialized rendering hardware for rendering specific types of primitives to be rendered. Frame buffer(s) 240 includes an index value for every pixel to be displayed on the display output device. The index value read from the frame buffer is used to read LUT 245 for the actual color to be displayed. A DAC (digital-to-analog converter) 250 converts the digital data stored in the LUT into RGB signals to be provided to the display 150, thereby rendering the desired image output from the main processor.

In the preferred embodiment, the color image compression technique could be utilized in the computer application software which is executed by the main processor. As would be obvious to one of ordinary skill in the art, the present technique could be applied in many other locations within the host computer or display adapter. For illustrative purposes, the present invention is described below utilizing a 24 bit RGB color system (8 bits each for red, green, and blue color component) with an 8 bit frame buffer, a 256 color video Look Up Table (LUT), and a 640×480 display.

Figure 4:
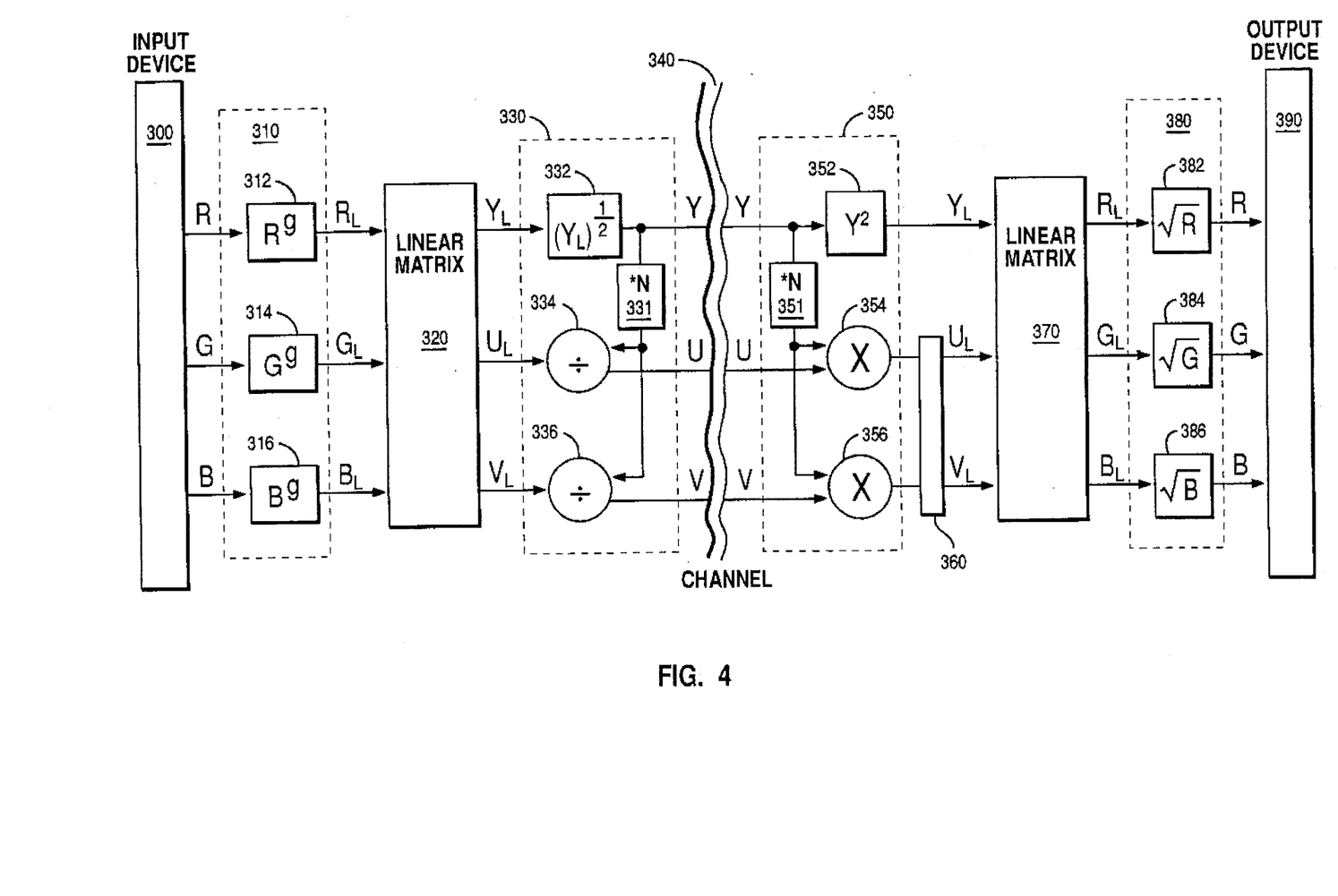
FIG. 4 is a block diagram of linear color processing techniques used in a preferred embodiment of the invention.

FIG. 4 is a block diagram of linear color processing techniques used in a preferred embodiment of the invention. An image input device 300, such as the camera described in FIG. 1, generates a nonlinear RGB color signal. The image could include a still photograph, a video of multiple sequential photographs, or the like. The RGB signals are then linearized or gamma corrected by linearizer 310 which includes separate linearizers 312, 314 and 316 for linearizing or gamma correcting each of the RGB signals separately. The RGB signals are linearized or gamma corrected by raising them to the power g or gamma (typically 2) resulting in linear red, green and blue color signals ($R_L$, $G_L$, $R_L$). In alternative embodiments, an image input device may generate linear red, green and blue signals that do not need to be linearized.

The linear red, green and blue color signals are then translated or converted to linear luminance and chrominance signals ($Y_L$, $U_L$, $V_L$) by linear matrix 320. This is preferably the same linear matrix used in the prior art as described in FIG. 1 above. The luminance and chrominance signals are then converted by convertor 330 which includes normalizer 331 and converters 332, 334 and 336 to convert the luminance and chrominance signals separately. In the preferred embodiment, a square root of the luminance signal is taken to equalize the noise of the various levels of luminance. In alternative embodiments, other powers may be used such as 1/g where g is approximately equal to 2. The luminance signal is normalized by multiplying it by a factor N which is preferably equal to the square root of two in our example. The linear chrominance signals are then divided by the converted luminance signal such that the magnitude of the converted chrominance signals matches the magnitude of the converted luminance signal. The normalization factor is to assist in matching the magnitude of the luminance and chrominance to the channel capacity. In alternative embodiments, the signals may be normalized by adjusting the values in the linear matrix.

The converted luminance and chrominance signals are then transmitted or stored on channel 340. This may be done as described above with reference to FIG. 1 including the same data compression techniques or some alternative data compression techniques. The received converted luminance and chrominance signals are then converted back to linear luminance and chrominance signals by converter 350 which includes normalizer 351 and converters 352, 354 and 356 to convert the luminance and chrominance signals separately. In the preferred embodiment, a square of the luminance signal is taken although other powers may be used such as g where g is approximately equal to 2. The chrominance signals are then multiplied by the converted and normalized luminance signal.

An optional low pass filter 360 may be included. The low pass filter helps in reducing some image effects in some cases and may create other image effects in other cases. These effects will be cussed in greater detail below with reference to FIGS. 5A–5K. Due to the possible help and harm of a low pass filter, the filter may be used or system controlled for each image or possibly for each pixel. However, greater control of a low pass filter will add overhead to the system. Therefore, the level of filter control is based on the type of application the present invention is being applied to.

The resulting linear luminance and chrominance signals are then translated or converted to linear red, green and blue signals by linear matrix 370. This is preferably the same linear matrix used in the prior art as described in FIG. 1 above. The RGB signals are then nonlinearized or gamma adjusted by nonlinearizer 380 which includes separate nonlinearizers 382, 384 and 386 for nonlinearizing or gamma adjusting each of the linear RGB signals separately. The RGB signals are nonlinearized by or gamma adjusted by taking them to the power 1/g (typically ½) resulting in a nonlinear RGB signal. The RGB signal is then sent to an output device 390 such as a display, printer, plotter or the like. In alternative embodiments, an output device may receive linear red, green and blue signals that do not need to be nonlinearized.

In the preferred embodiment, the above process is performed by software on digital color signals. However, in alternative embodiments, the above may also be accomplished in circuitry for analog color signals.

Figure 5A:
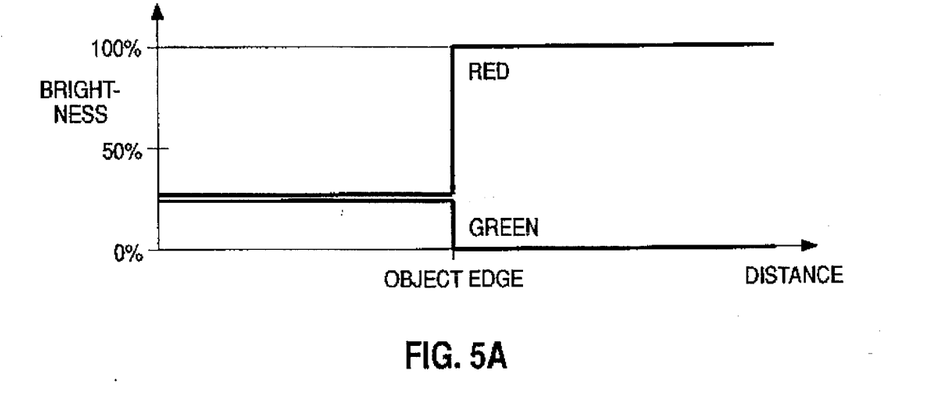
FIGS. 5A–5K illustrate some of the advantages of the present invention over today's typical nonlinear color processing techniques.

FIGS. 5A–5K illustrate some of the advantages of the present invention over today's typical nonlinear color processing techniques. As described for FIGS. 2A–2E above, for simplicity of explanation, assume a two color red-green world where the eye is equally sensitive to both colors. In this case there are only RG and YU color signals rather than RGB and YUV. Given a bright red object over a dark gray or red-green background, a scan line as generated by a camera of the background and object would be as shown in FIG. 5A. This includes the red and green signals being gamma adjusted by the camera. As with FIG. 2A above, The brightness of the red and green signals is dark gray or about 20% across the scan line until the edge of the object is reached. At that point, the green signal drops to black or about 0% luminance while the red signal increases to white or about 100% luminance.

Figure 5B:
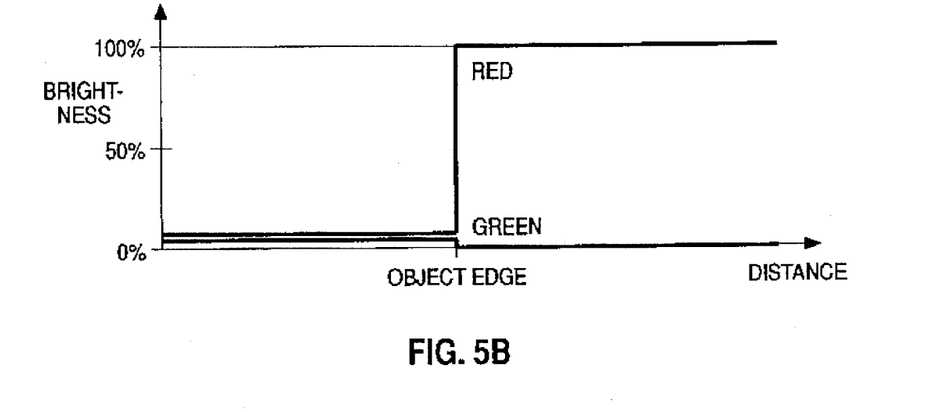

FIG. 5B illustrates the result of the linearization of red and green by linearizer 310 described above. The square of the 20 percent or 0.2 red and green signals results in a 4 percent or 0.04 signal of the image background. Since the square of 0 percent green is 0 and the square of 100 percent red is 100 percent, the red and green signals of the image object do not change significantly.

Figure 5C:
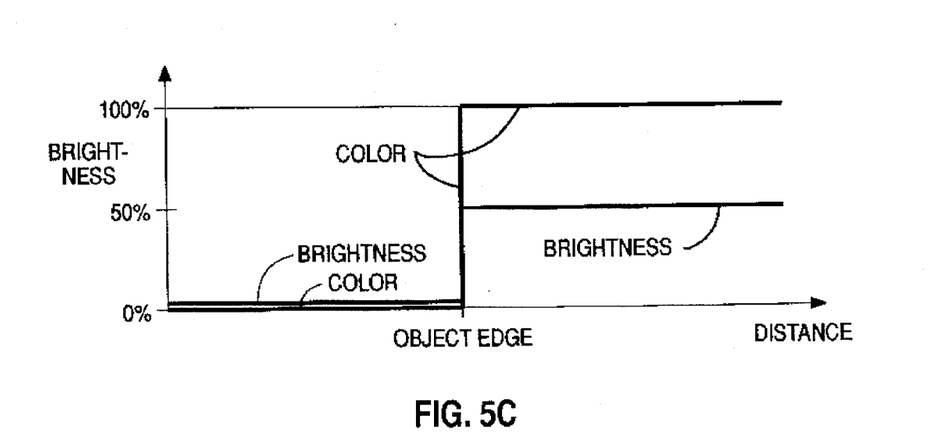

FIG. 5C illustrates the linear luminance and chrominance signals after the linear RGB signals were converted by linear matrix 320. Note that the color signal goes from 0 percent (no difference in luminance for the two colors) to 100 percent at the object edge as the difference in color goes to about 100 percent. Note also that luminance goes from near 4 percent (the average luminance of the red and green colors) to 50 percent at the object edge as the average luminance of the two colors is 50 percent.

Figure 5D:
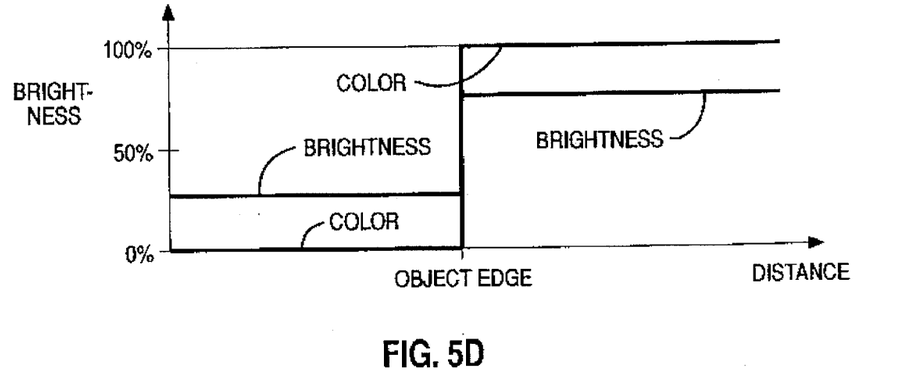

FIG. 5D illustrates the luminance and chrominance signals after the conversion process of converter 330. The square root of the luminance causes the luminance signal to go from about 20 percent (the square root of about 4 percent) to about 71 percent (the square root of 50 percent). The color signal goes from 0 percent (0 percent divided by anything is 0) to 100 percent (100 percent chrominance divided by a normalized brightness factor).

Figure 5E:
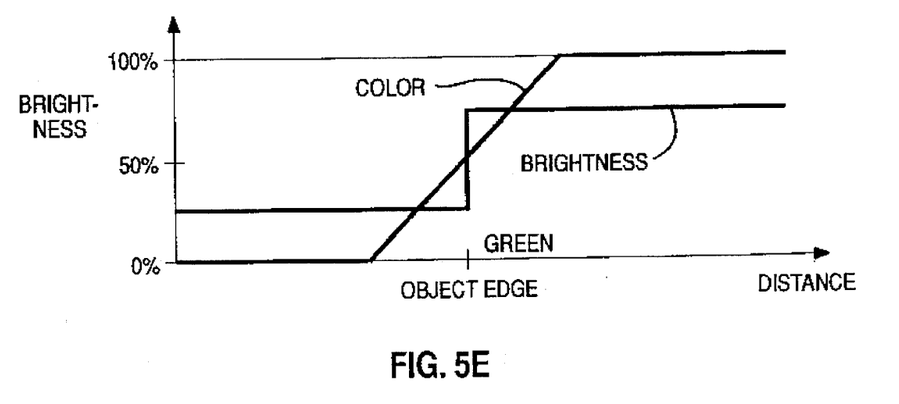

As a result of the channel process described in FIG. 4 above, including image compression of the U signal, the YU luminance and color signals are received on the channel as shown in FIG. 5E. Note the similarity to FIG. 2B. The chrominance signal has a gradual or slanted slope due to the bandwidth or data compression on the channel and the luminance signal has an abrupt transition at the object edge. However, the luminance signal has a greater magnitude than the luminance in FIG. 2B.

Figure 5F:
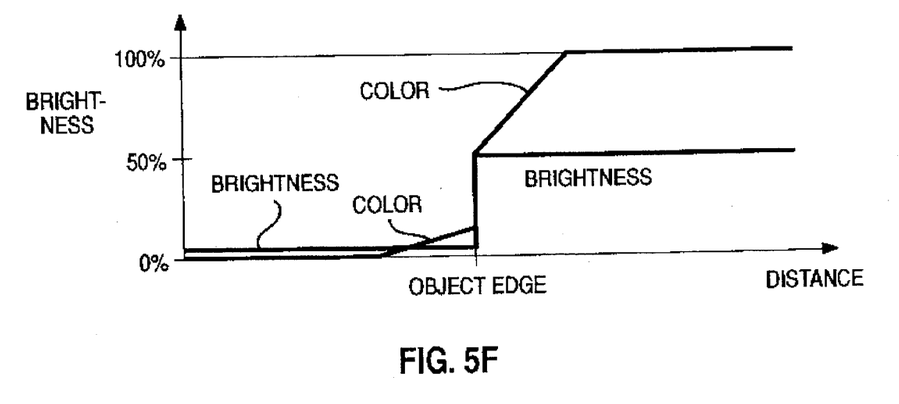

FIG. 5F shows the received signal from the channel after the YU signal has been converted back to linear color signals by converter 350 but prior to any low pass filtering of the signal. Note that the color signal is more abrupt than the color signal of FIG. 2B.

Figure 5G:
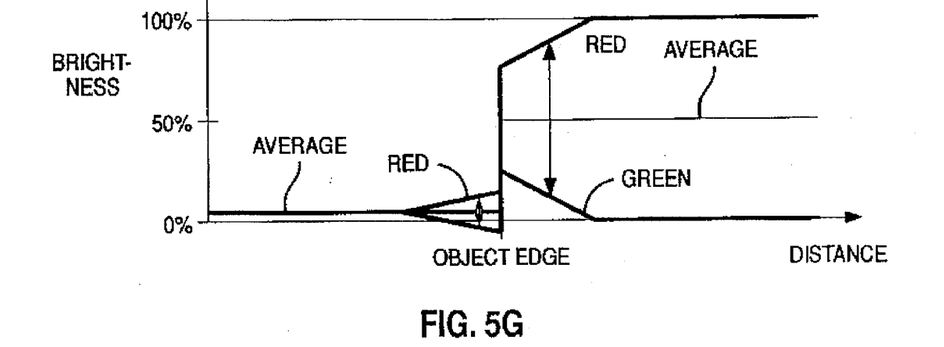
Figure 5H:
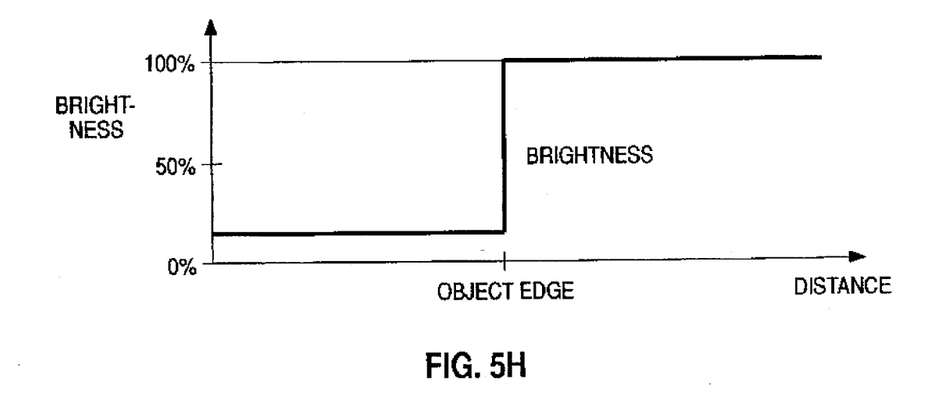

FIGS. 5G and 5H illustrate the nonlinear RG signal and the brightness of those signals as converted by linear matrix 370. This is also the image as displayed after the square root of the signals is taken and then the signals are squared in the display process. As compared to FIG. 2D and 2E, the colors are slightly brighter after the edge of the object is reached. However, and more importantly, the brightness achieves a more abrupt transition at the edge of the object. As a result, the edge luminance detail at the object edge is preserved by utilizing the present invention. This technique provides for a more clear displayed image as perceived by the eye because the human eye is very sensitive to luminance detail.

Figure 5I:
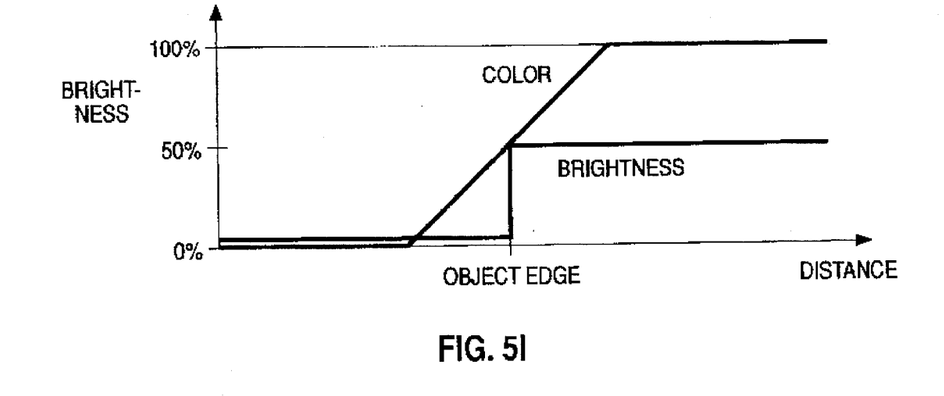
Figure 5J:
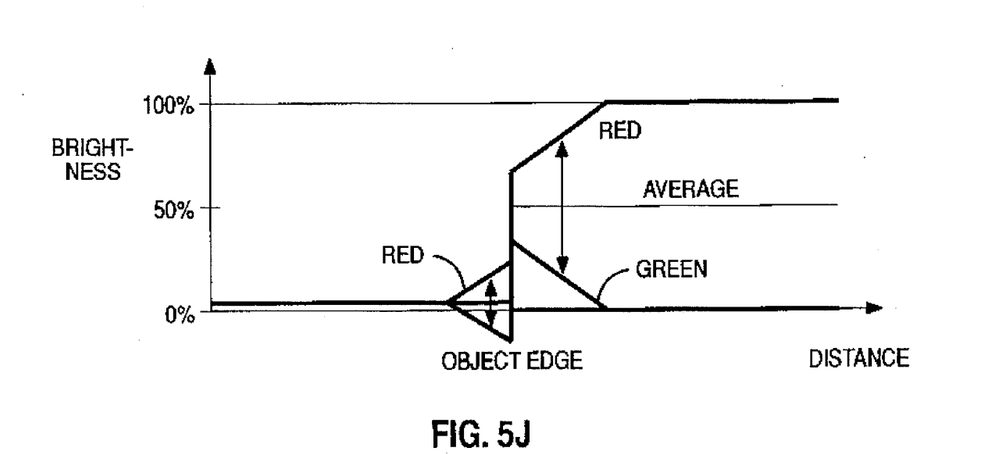
Figure 5K:
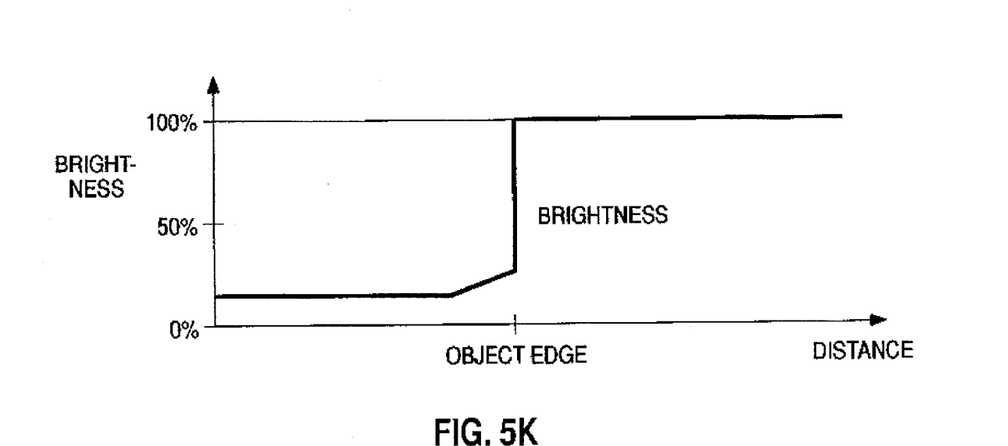

FIGS. 5I–5K are similar to FIGS. 5F–5H except that the low pass filter has been utilized. In the preferred embodiment, the low pass filter would have the same bandwidth as the channel and is utilized to filter high frequencies caused by the conversion processes without removing any information passed by the channel. FIG. 5I illustrates the YU signals immediately after low pass filtering. Note that the color signal has a more gradual slope than the nonfiltered output illustrated in FIG. 5F. FIGS. 5J and 5K are similar to FIGS. 5G and 5H except to the left of the object edge the colors and brightness are less abrupt and have a more gradual slope. Therefore, for the illustrated example, the use of a low pass filter is not desirable.

Another example where a low pass filter is not desirable in the present invention is a change in brightness without a change in color such as a shadow or texture of an object with a solid color. In this case, the low pass filter would cause the light edge of the border to have a less intense color and the dark edge of the border to have a more intense color. An example where a low pass filter would be desirable is an edge transition between a dark intense color and a light pastel color. In this case, the low pass filter would soften the dark intense color bleed over into the soft pastel color.

Figure 6:
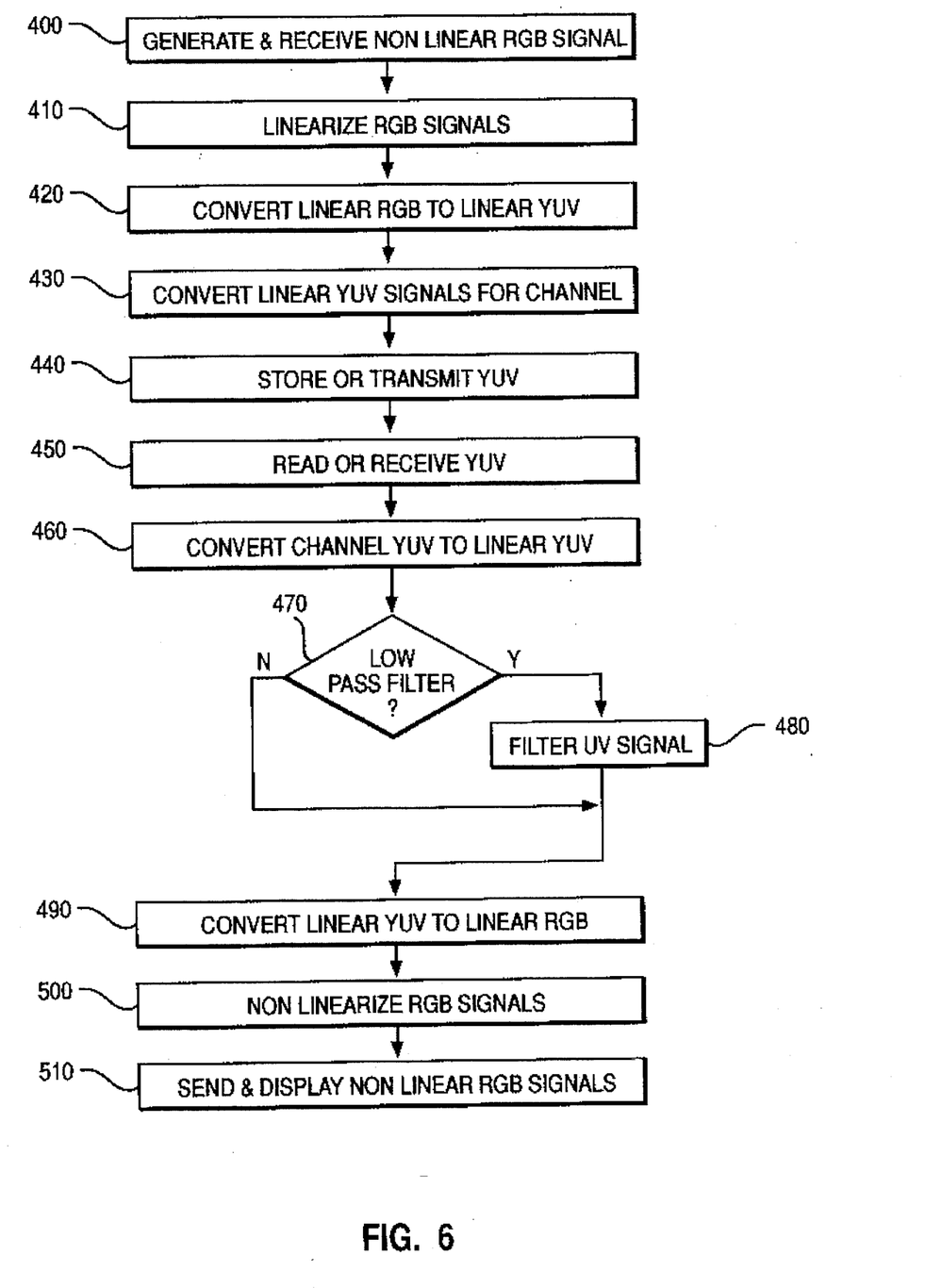
FIG. 6 is a flowchart of linear color processing techniques used in a preferred embodiment of the invention.

FIG. 6 is a flowchart of linear color processing techniques used in a preferred embodiment of the invention. In a first step 400, an image input device generates a nonlinear RGB color signal. In a second step 410, the nonlinear RGB signals are then linearized or gamma corrected by a linearizer. The RGB signals are linearized or gamma corrected by raising them to the power g or gamma (typically 2) resulting in linear red, green and blue color signals ($R_L$, $G_L$, $R_L$). In alternative embodiments, an image input device may generate linear red, green and blue signals that do not need to be linearized.

In a third step 420, the linear red, green and blue color signals are then converted to linear luminance and chrominance signals ($Y_L$, $U_L$, $V_L$) by a linear matrix. This is preferably the same linear matrix used in the prior art as described in FIG. 1 above. In a fourth step 430, the luminance and chrominance signals are then converted in preparation for storage or transmission. In the preferred embodiment, a square root of the luminance signal is taken to equalize the noise of the various levels of luminance. In alternative embodiments, other powers may be used such as 1/g where g is approximately equal to 2. The luminance signal is normalized by multiplying it by a factor N which is preferably equal to the square root of two in our example. The linear chrominance signals are then divided by the converted luminance signal such that the magnitude of the converted chrominance signals matches the magnitude of the converted luminance signal. The normalization factor is to assist in matching the magnitude of the luminance and chrominance to the channel capacity. In alternative embodiments, the signals may be normalized by adjusting the values in the linear matrix.

In a fifth step 440, the converted luminance and chrominance signals are then transmitted or stored on a channel such as a storage device or a transmission device. This may be done as described above with reference to FIG. 1 including the same data compression techniques or some alternative data compression techniques. In a sixth step 450, the luminance and chrominance signals are received after being sent on the channel. In a seventh step 460, the received converted luminance and chrominance signals are then converted back to linear luminance and chrominance signals by a converter. In the preferred embodiment, a square of the luminance signal is taken although other powers may be used such as g where g is approximately equal to 2. The chrominance signals are then multiplied by the converted and normalized luminance signal.

In an eighth step 470, it is determined whether to run the received signal through a low pass filter. The low pass filter helps in reducing some image effects in some cases and may create other image effects in other cases. These effects have been discussed in greater detail above with reference to FIGS. 5A–5K. Due to the possible help and harm of a low pass filter, the filter may be user or system controlled for each image or possibly for each pixel. However, greater control of a low pass filter will add overhead to the system. Therefore, the level of filter control is based on the type of application the present invention is being applied to. In a ninth step 480, the low pass filter is used to filter the signal if desired.

In step 490, the resulting linear luminance and chrominance signals are then converted to linear red, green and blue signals by a linear matrix. This is preferably the same linear matrix used in the prior art as described in FIG. 1 above. In step 500, the RGB signals are then nonlinearized or gamma adjusted by a nonlinearizer. The RGB signals are nonlinearized by or gamma adjusted by taking them to the power 1/g (typically ½) resulting in a nonlinear RGB signal. In step 510, the RGB signal is then sent to an output device such as a display, printer, plotter or the like. In alternative embodiments, an output device may receive linear red, green and blue signals that do not need to be nonlinearized.

The main advantage of using the above described linear color processing techniques over typical nonlinear color processing is to preserve the luminance detail at edges. This is accomplished in spite of degradation of the chrominance signals across a channel because there is much less or no crossover of the luminance signal to the chrominance signals during processing of the color signals. Nonlinear color processing causes some of the luminance signal to be passed in the chrominance signals due to performing linear processing techniques such as linear matrix conversions on nonlinear signals.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method for processing multiple color signals representing an image comprising the steps of:
    a) obtaining multiple linear red, green and blue color signals representing said image;
    b) processing said multiple linear color signals to obtain a linear luminance signal and at least two linear chrominance signals; and
    c) converting said linear luminance signal and said at least two linear chrominance signals to a nonlinear luminance signal and to at least two non-linear chrominance signals, said step of converting including:
        i) gamma correcting said linear luminance signal to said nonlinear luminance signal; and
        ii) dividing said at least two linear chrominance signals by said in order to obtain two-linear luminance signal nonlinear luminance signal.

2. The method of claim 1 wherein said step of obtaining includes the steps of:
    a) obtaining multiple nonlinear red, green and blue color signals representing said image; and
    b) linearizing said multiple nonlinear color signals to multiple linear color signals.

3. The method of claim 2 further comprising the step of channeling said nonlinear luminance signal and said at least two nonlinear chrominance signals.

4. The method of claim 3 wherein said step of channeling includes storing said nonlinear luminance signal and said at least two nonlinear chrominance signals.

5. The method of claim 3 wherein said step of channeling includes transmitting said nonlinear luminance signal and said at least two nonlinear chrominance signals.

6. The method of claim 3 further comprising the step of converting said channeled nonlinear luminance signal to a linear luminance signal.

7. The method of claim 6 further comprising the step of converting said channeled at least two nonlinear chrominance signals to an at least two linear chrominance signals.

8. The method of claim 7 wherein said step of converting said channeled at least two nonlinear chrominance signals includes multiplying said channeled at least two nonlinear chrominance signals by said channeled nonlinear luminance signal.

9. The method of claim 7 further comprising the step of low pass filtering said at least linear chrominance signals.

10. The method of claim 7 further comprising the step of translating said linear luminance and said at least two linear chrominance signals to multiple linear color signals.

11. The method of claim 10 further comprising the step of generating an image from said multiple linear color signals.

12. An apparatus for processing multiple color signals representing an image comprising:
    a) means for obtaining multiple linear red, green and blue color signals representing said image;
    b) means for processing said multiple linear color signals to obtain a linear luminance signal and at least two linear chrominance signals; and
    c) means for converting said linear luminance signal and said at least two linear chrominance signals to a nonlinear luminance signal and to at least two non-linear chrominance signals, said means for converting including;
   i) means for gamma correcting said linear luminance signal to said nonlinear luminance signal; and
   ii) means for dividing said at least two linear chrominance signals in order to obtain two non-linear chrominance signal.

13. The apparatus of claim 12 wherein said means for obtaining includes:
   a) means for obtaining multiple nonlinear red, green and blue color signals representing said image; and
   b) means for linearizing said multiple nonlinear color signals to multiple linear color signals.

14. The apparatus of claim 13 further comprising means for channeling said nonlinear luminance signal and said at least two nonlinear chrominance signals.

15. The apparatus of claim 14 wherein said means for channeling includes memory for storing said nonlinear luminance signal and said at least two nonlinear chrominance signals.

16. The apparatus of claim 14 wherein said means for channeling includes means for transmitting said nonlinear luminance signal and said at least two nonlinear chrominance signals.

17. The apparatus of claim 15 further comprising means for converting said nonlinear luminance signal that has been channeled to a linear luminance signal.

18. The apparatus of claim 17 further comprising means for converting said channeled at least two nonlinear chrominance signals to an at least two linear chrominance signals.

19. The apparatus of claim 18 wherein said means for converting said channeled at least two nonlinear chrominance signals includes means for multiplying said channeled at least two nonlinear chrominance signals by said channeled nonlinear luminance signal.

20. The apparatus of claim 18 further comprising means for low pass filtering said at least two linear chrominance signal.

21. The apparatus of claim 18 further comprising means for translating said linear luminance and said at least two linear chrominance signals to multiple linear color signals.

22. The apparatus of claim 21 further comprising means for generating an image from said multiple linear color signals.

23. A computer program product stored in memory and executable by a processor for processing multiple color signals representing an image comprising:
   a) program code means stored in memory for obtaining multiple linear red, green and blue color signals representing said image;
   b) program code means stored in memory for instructing a computer processor to process said multiple linear color signals to obtain a linear luminance signal and at least two linear chrominance signal;
   c) program code means stored in memory for converting said linear luminance signal and said at least two linear chrominance signals to a nonlinear luminance signal and to at least two nonlinear chrominance signals, said program code means stored in memory for converting including:
      i) program code means for gamma correcting said linear luminance signal to said nonlinear luminance signal; and
      ii) program code means for dividing said at least two linear chrominance signals by said in order to obtain two non-linear chrominance signals nonlinear luminance signal.

24. The computer program product of claim 23 wherein said program means for obtaining includes:
   a) program code means stored in memory for obtaining multiple nonlinear red, green and blue color signals representing said image; and
   b) program code means stored in memory for linearizing said multiple nonlinear color signals to multiple linear color signals.

25. A data processing system for processing multiple color signals representing an image comprising:
   a) a processor for processing data;
   b) a memory for storing data for processing;
   c) input means coupled to said processor for obtaining multiple linear red, green and blue color signals representing said image;
   d) means for processing said multiple linear color signals to obtain a linear luminance signal and at least two linear chrominance signal;
   e) means for converting said linear luminance signal and said at least two linear chrominance signals to a nonlinear luminance signal and to at least two non-linear chrominance signals, said means for converting including:
      i) means for gamma correcting said linear luminance signal to said nonlinear luminance signal; and
      ii) means for dividing said at least two linear chrominance signals by said in order to obtain two-linear chrominance signals nonlinear luminance signal.

26. The data processing system of claim 25 wherein said input means includes:
   a) input means for obtaining multiple nonlinear red, green and blue color signals representing said image; and
   b) means for linearizing said multiple nonlinear color signals to multiple linear color signals.

* * * * *

UNITED STATES PATENT AND TRADEMARK OFFICE
CERTIFICATE OF CORRECTION

PATENT NO.  : 5,543,820
DATED       : August 6, 1996
INVENTOR(S) : Albert D. Edgar It is certified that error appears in the above-indentified patent and that said Letters Patent is hereby corrected as shown below:

On the title page: Item [57] Abstract, line 9, delete "luminarice" insert --luminance--;

Column 8, lines 22 and 23, delete "two linear luminance signal" and insert --two off non-linear chrominance signals --.

Column 9, line 7, delete "signal" insert --signals --.

Col. 10, line 13, delete "in order to obtain";
       line 14, delete "two non-linear chrominance signals";
       line 43, delete "in order to obtain two-linear"; and
       line 44, delete "chrominance signals".

Signed and Sealed this

Twenty-second Day of July, 1997

Attest:

Attesting Officer

BRUCE LEHMAN

Commissioner of Patents and Trademarks